(12) United States Patent
Hansen et al.

(10) Patent No.: US 10,739,315 B2
(45) Date of Patent: Aug. 11, 2020

(54) METHOD FOR EXAMINING THE RACEWAY OF A LARGE ROLLER BEARING

(71) Applicant: Nordex Energy GmbH, Hamburg (DE)

(72) Inventors: Ocke-Philipp Hansen, Hamburg (DE); Stephan Boerner, Barsbuettel (DE); Jan Fischer, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 331 days.

(21) Appl. No.: 15/847,495

(22) Filed: Dec. 19, 2017

(65) Prior Publication Data

US 2018/0180576 A1 Jun. 28, 2018

(30) Foreign Application Priority Data

Dec. 22, 2016 (EP) .................................. 16206092

(51) Int. Cl.
*G01N 29/26* (2006.01)
*G01N 29/30* (2006.01)
*G01M 13/045* (2019.01)
*G01N 29/22* (2006.01)
*G01N 29/04* (2006.01)
*G01N 29/44* (2006.01)
(Continued)

(52) U.S. Cl.
CPC .......... *G01N 29/262* (2013.01); *F16C 19/52* (2013.01); *F16C 33/585* (2013.01); *F16C 41/007* (2013.01); *G01M 13/045* (2013.01); *G01N 29/043* (2013.01); *G01N 29/221* (2013.01); *G01N 29/30* (2013.01); *G01N 29/4445* (2013.01); *F16C 2233/00* (2013.01); *F16C 2300/14* (2013.01); *F16C 2360/31* (2013.01); *G01N 2291/0234* (2013.01); *G01N 2291/0258* (2013.01); *G01N 2291/0289* (2013.01); *G01N 2291/044* (2013.01); *G01N 2291/106* (2013.01); *G01N 2291/2696* (2013.01)

(58) Field of Classification Search
CPC .. F16C 19/52; F16C 2233/00; F16C 2300/14; F16C 2360/31; F16C 33/585; F16C 41/007; G01M 13/045; G01N 2291/0234; G01N 2291/0258; G01N 2291/0289; G01N 2291/044; G01N 2291/106; G01N 2291/2696; G01N 29/043; G01N 29/221; G01N 29/262; G01N 29/30; G01N 29/4445
USPC ........................................................ 73/593
See application file for complete search history.

(56) References Cited

U.S. PATENT DOCUMENTS

| 4,798,299 A | 1/1989 | Bayer et al. |
| 5,074,677 A * | 12/1991 | Andree .................. B66C 23/84 384/448 |

(Continued)

FOREIGN PATENT DOCUMENTS

| EP | 2743522 A1 | 6/2014 |
| WO | WO-2013057276 A1 * | 4/2013 ............ G01M 13/04 |

*Primary Examiner* — Nimeshkumar D Patel
*Assistant Examiner* — Nashmiya S Fayyaz
(74) *Attorney, Agent, or Firm* — Walter Ottesen, P.A.

(57) ABSTRACT

A method for examining the raceway of a large roller bearing in a wind turbine, in which a raceway of the large roller bearing is measured using an ultrasonic measuring unit mounted on the bearing housing, wherein the ultrasonic measuring unit detects two edges of the raceway and the relative position and/or formation thereof in relation to one another is measured.

7 Claims, 2 Drawing Sheets

(51) Int. Cl.
   *F16C 33/58* (2006.01)
   *F16C 19/52* (2006.01)
   *F16C 41/00* (2006.01)

(56) References Cited

U.S. PATENT DOCUMENTS 5,226,736 A 7/1993 Becker et al.
5,971,619 A 10/1999 Bourgeois-Jacquet et al.
8,181,528 B2 5/2012 Reed et al.

* cited by examiner

METHOD FOR EXAMINING THE RACEWAY OF A LARGE ROLLER BEARING

CROSS REFERENCE TO RELATED APPLICATION

This application claims priority of European patent application no. 16 206 092.5, filed Dec. 22, 2016, the entire content of which is incorporated herein by reference.

FIELD OF THE INVENTION

The present invention relates to a method for examining the raceway of a large roller bearing. The goal of the examination is to recognize damage, wear, cracks, and further appearances of wearing in the bearing early and reliably.

BACKGROUND OF THE INVENTION

A device for monitoring roller bearings is known from U.S. Pat. No. 5,226,736 A. The device is provided for recognizing and monitoring damage on raceways or adjoining regions of the bearing rings, wherein one or more sensors are arranged in the roller body installation space between the roller bodies and transmit measuring signals electromagnetically to an antenna arranged outside the bearing housing.

A method and a device for ultrasonic examination of a gearwheel in a transmission are known from U.S. Pat. No. 8,181,528 B2. To examine cracks in particular, an ultrasonic measuring head is placed on the external surface of the gearwheel and moved around the bearing along the external surface. The ultrasonic measuring head can be configured as a phased-array measuring head, wherein the measurement takes place from multiple directions.

A large roller bearing is known from U.S. Pat. No. 5,074,677 A, in which a receptacle for an ultrasonic probe is formed in one ring and the other ring has a coupling surface configured such that a simple and reliable ultrasonic measurement system is arranged. The revolving coupling surface reflects the introduced ultrasonic power.

In an article by G. Splitt and G. Kaut "Phased Arrays—Eine zeitgemäße Lösung von Prufaufgaben in der ZFT [a timely solution of testing tasks in the ZFT]", from the DGZFP annual conference 2001, nondestructive material testing in Berlin, 21 to 25 May 2001, the use of phased-array measuring heads is discussed for ultrasonic testing. In this case, it is shown on the basis of examples from practice which advantages the use of phased-array measuring heads have, wherein solely electronic scanning of the test subject in one direction is represented as a particular advantage in relation to the movement of measuring head and test subject required in the conventional testing technology.

In the configuration of large roller bearings for wind turbines, a variety of different aspects are to be taken into consideration in the configuration of the bearing. The structural introduction of coupling surfaces into the large roller bearing for the use of an ultrasonic examination is generally very complex in this case and is linked to a substantial expenditure.

SUMMARY OF THE INVENTION

It is an object of the invention to provide a method for examining a raceway of a large roller bearing in a wind turbine, which supplies reliable examination results using simple means.

The object can, for example, be achieved by a method for examining the raceway of a large roller bearing in a wind turbine which includes the steps of: measuring the raceway of the large roller bearing with an ultrasonic measuring unit, wherein the measuring with the ultrasonic measuring unit includes detecting two edges of the raceway and detecting at least one of a relative position and a formation of the two edges in relation to one another.

The method according to the invention is provided and intended for examining the raceway of a large roller bearing in a wind turbine. Such a large roller bearing in a wind turbine is, for example, a bearing for the drivetrain or a bearing for the azimuthal tracking of the nacelle. The large roller bearing has a bearing housing, on which an ultrasonic measuring unit is mounted. The ultrasonic measuring unit is oriented on a raceway of the large roller bearing. It is provided, according to an aspect of the invention, that the ultrasonic measuring unit detects two edges delimiting the raceway and the relative position and/or formation thereof in relation to one another is measured. The relative position of the two edges of the raceway in relation to one another is expressed in particular in the distance of the edges in relation to one another. The relative distance is preferably analyzed by an analysis of the distances of the two edges in relation to the measuring head. In addition to the distance of the two edges in relation to one another, the formation thereof can also be analyzed, for example, by stopping on a widening or another deformation of the edges. A shape comparison of the edges in relation to one another can also be used here to establish deviations from one another and in this manner recognize flaws early.

In one preferred embodiment of the method, a phased-array measuring head is used for the measurement. The use of such a measuring head offers the advantage that without a relative movement of test subject in relation to measuring head, reference values are always provided by both edges, which enable a direct analysis. It has also proven to be particularly advantageous in this case that the ultrasonic measuring unit can be fixedly mounted on the bearing housing.

In a further preferred embodiment, each of the edges and a raceway between the edges are measured. In this case, different flaw types can be diagnosed. The flaws include, for example, damage to the upper or the lower edge, and also damage to the raceway between the edges. In general, depending on the construction and position in relation to the raceway, a lubricant groove can also be detected and analyzed. Advantageously, for example, an increasing distance between the two edges is recognized as damage to the edges. A widening of at least one of the edges can also be recognized as a flaw. One advantageous configuration of the invention will be described hereafter in greater detail on the basis of an exemplary embodiment.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
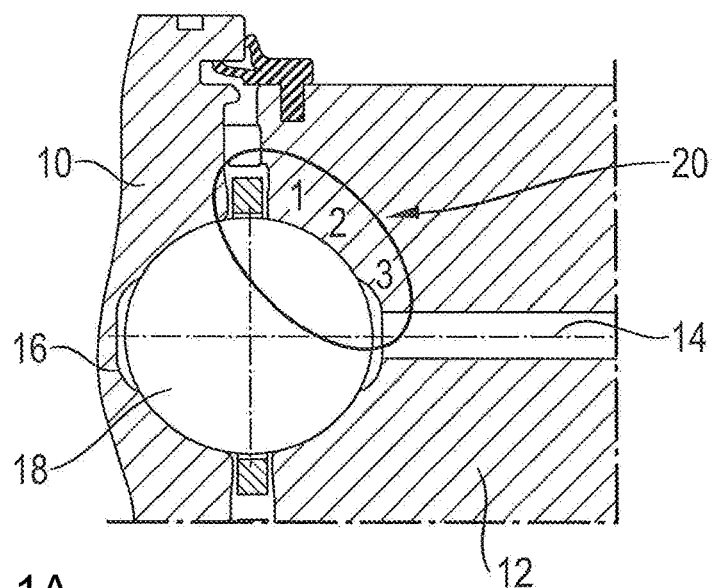
FIGS. 1A and 1B show a schematic cross-sectional view of a ball raceway having three reflection points.

FIG. 1A shows a cross section through a ball bearing having an outer bearing ring 10 and an inner bearing ring 12. The inner bearing ring 12 has a central borehole, from which lubricant (not shown) can be introduced into a lubricant groove 16. A ball 18 is provided as a roller body between the inner bearing ring 12 and the outer bearing ring 10. Various shapes and structural types of roller bodies are possible in large roller bearings. Thus, rollers, cones, and drums, with or without cage guide, can be used in the roller bearing, in addition to the balls.

The region 20 shown in FIG. 1A forms a running surface for the ball 18. In the case of an externally applied ultrasonic measuring head (not shown), the regions identified with 1, 2, and 3 on the running surface 20 can be examined in particular. The transition of the edge to the lubricant groove 16 is identified by 3, the running surface is identified by 2, and the edge to the connection between the inner bearing ring 12 and the outer bearing ring 10 is identified by 1 here. A cage guide for the ball 18 can also be used here, for example.

Figure 1B:
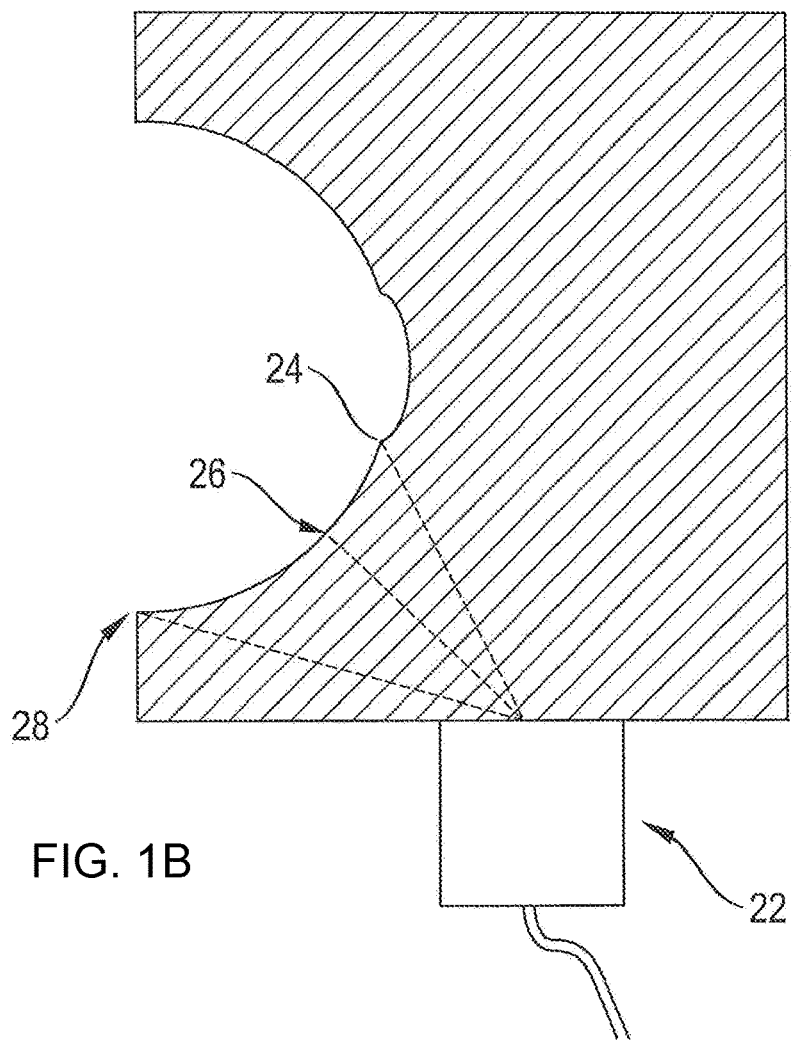

FIG. 1B shows a phased-array measuring head 22, which is aligned on a reference edge 24. The reference edge 24 is at 41°, for example, and can form a reference distance for the distance measurements, the edges 28, and a region 26 of the running surface.

Figure 2:
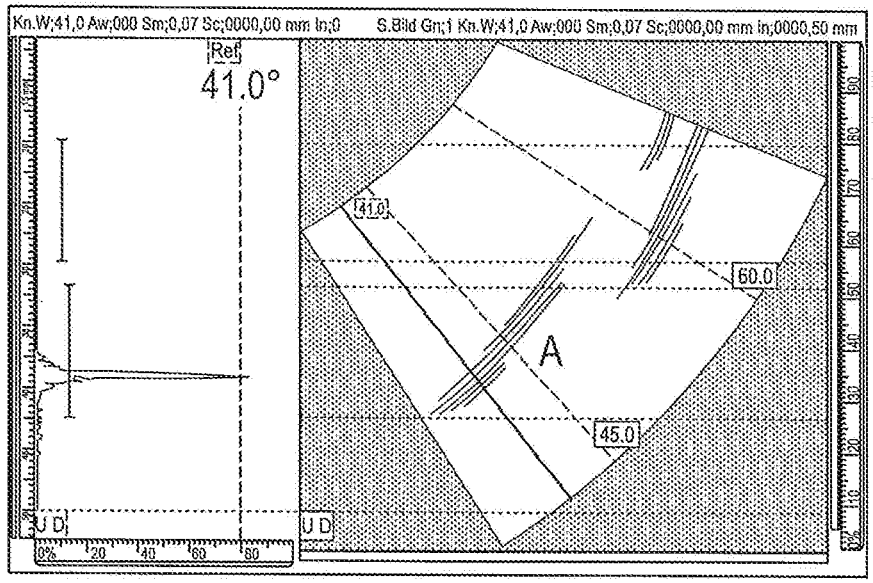
FIG. 2 shows the result of a check measurement for a reference edge in relation to the lubricant groove at 41°; and, FIG. 3 shows the result of a reference measurement for the display of a testing edge in relation to the cage guide at 62°.

FIG. 2 shows check measurements recorded by way of example, in which the ultrasound of the edge in relation to the lubricant groove reflected at an angle of 41° is shown. It can be seen in the illustration identified by A that the edge stands out sharply contoured.

Figure 3:
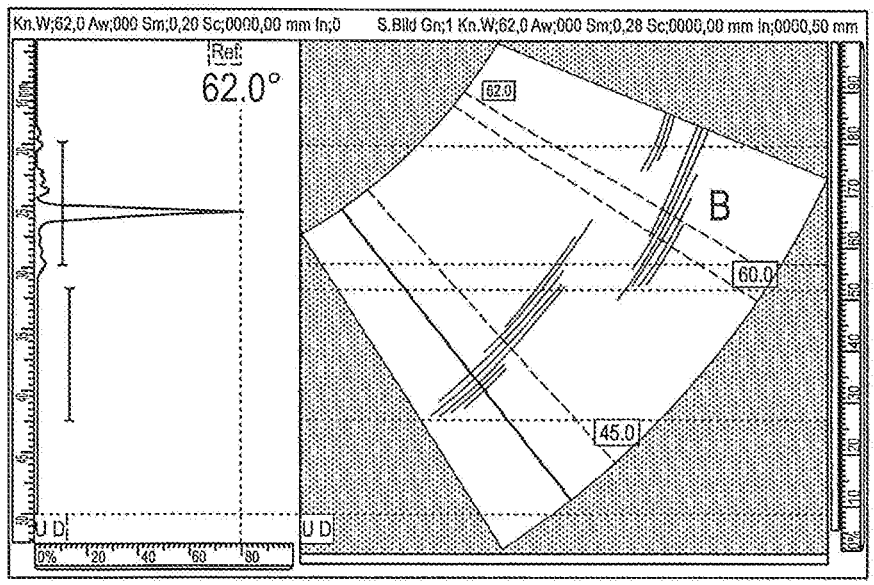

FIG. 3 shows the measurement of an edge, which is associated with a cage guide at 62°: The edge is shown wider here than the edge to the lubricant groove. However, the shape and extension of the edge B indicate that it is intact.

It is understood that the foregoing description is that of the preferred embodiments of the invention and that various changes and modifications may be made thereto without departing from the spirit and scope of the invention as defined in the appended claims.

LIST OF REFERENCE NUMERALS

10 outer bearing ring
12 inner bearing ring
16 lubricant groove
18 ball
20 running surface
22 phased-array measuring head
24 reference edge
26 edge
28 edge

What is claimed is:

1. A method for examining a raceway of a large roller bearing in a wind turbine, the method comprising the steps of:
    measuring the raceway of the large roller bearing with an ultrasonic measuring unit, wherein the measuring with the ultrasonic measuring unit includes detecting two edges of the raceway and detecting at least one of a relative position and a formation of the two edges in relation to one another, wherein the two edges include a first edge at a transition of a running surface to a lubricant groove and a second edge between an inner bearing ring and an outer bearing.

2. The method of claim 1, wherein a phased-array measuring head is used for the ultrasonic measuring unit.

3. The method of claim 1, wherein the ultrasonic measuring unit is fixedly mounted on a bearing housing.

4. The method of claim 1, wherein each of the two edges and the running surface between the two edges is measured.

5. The method of claim 1, wherein an increasing distance between the two edges is recognized as damage of at least one of said two edges.

6. The method of claim 1, wherein a widening of at least one of the two edges is recognized as a flaw.

7. The method of claim 1, wherein:
    the large roller bearing defines the raceway between the two edges; and,
    the measuring the raceway includes measuring each of the two edges and the running surface.

* * * * *